May 20, 1947.   W. C. MacFADDEN   2,420,754
TERMINAL PANEL
Filed June 18, 1943
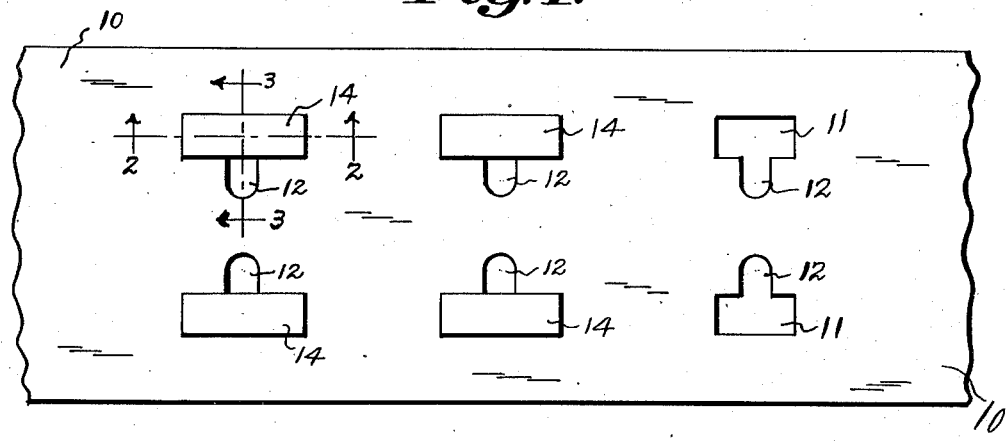
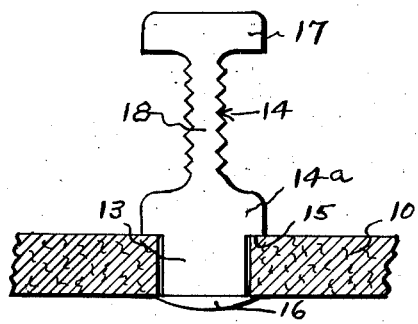
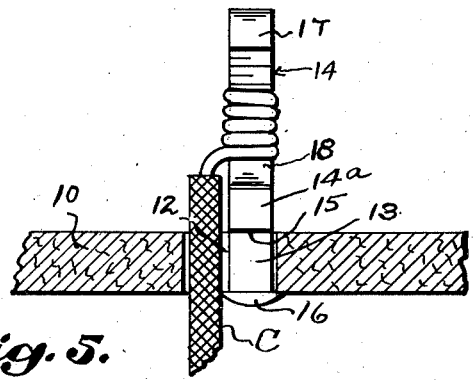
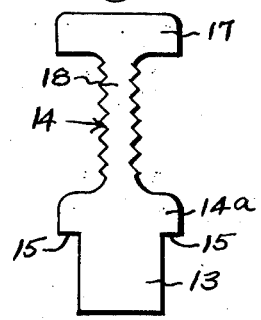
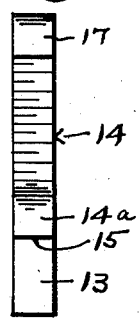
Inventor
Wilford C. MacFadden.
By Walter S. Jones
Attorney Patented May 20, 1947

2,420,754

UNITED STATES PATENT OFFICE 2,420,754

TERMINAL PANEL

Wilford C. MacFadden, Philadelphia, Pa., assignor to Cinch Manufacturing Corporation, Chicago, Ill., a corporation of Illinois Application June 18, 1943, Serial No. 491,415

2 Claims. (Cl. 173—324)

The present invention relates to terminal panels for electrical installations and aims generally to improve existing constructions of this type.

One of the primary aims and objects of the invention is the provision of an improved terminal panel and wiring lug that may be quickly assembled, providing a strong and economical construction.

A further aim and object of the invention is the provision of an improved wiring lug for terminal panels.

Illustrative of the invention, reference is made to the accompanying drawings illustrating a preferred embodiment of the invention, and in which:

Fig. 1 is a plan view of a portion of a terminal panel illustrating the wiring lugs mounted thereon, as well as the manner of forming the board for the reception of the wiring lugs;

Fig. 2 is an enlarged section taken on the line 2—2 of Fig. 1 showing the wiring lug in full;

Fig. 3 is a similar sectional view taken on the line 3—3 of Fig. 1 showing the wiring lug in full together with a wire connected thereto;

Fig. 4 is an enlarged front elevation of the improved lug; and

Fig. 5 is an edge elevation thereof.

Referring to the drawings, my improved terminal panel preferably comprises a supporting member 10 of suitable insulating material, such as phenolic condensation material, which is formed with a plurality of apertures for receiving and mounting the wiring lugs. Preferably the apertures are formed with an enlarged portion 11 for receiving a part of the wiring lug and an angularly extending portion 12 through which a conductor may be passed for connection to said wiring lug.

In the illustrated embodiment the enlarged portion 11 of the aperture is substantially rectangular as shown, but conveniently may be of any other shape, for example circular, and is of a size and shape to receive the attaching end 13 of the wiring lug 14.

In the illustrated embodiment the portion 11 is rectangular to receive a rectangular attaching portion 13 of the wiring lug and secure it non-rotatively in the panel.

The conductor-receiving portion 12 of the panel aperture is preferably disposed angularly with reference to the portion 11, so as to extend beyond the portion 11 and provide an opening through which a conductor C may be passed, as shown in Fig. 3. In the illustrated embodiment the aperture portion 12 is disposed at right angles to the portion 11 at the center thereof, thus forming a T-shaped opening. It will be appreciated, however, that the aperture portion 12 may be otherwise disposed with reference to the portion 11 without departing from the spirit of the invention and they may be disposed so as to be L, H, + or otherwise shaped as desired.

The attaching portion 13 of the wiring lug is preferably of a cross-sectional shape to correspond to the shape of the aperture portion 11 so as to be snugly fitted therein and preferably is of a length in excess of the thickness of the panel. The attaching portion 13 is of a reduced cross-section with reference to the base 14ª of the lug, so as to form a laterally offset shoulder 15 adapted to bear against one face of the panel 10.

Thus the wiring lug may be mounted in the panel by fitting the attaching portion 13 in the aperture portion 11 of the panel with the shoulder 15 abutting the face of the panel and thereafter upsetting the metal, as at 16, at the end of the attaching portion 13 over the opposite face of the panel by a riveting, swedging or pressing operation. This operation upsets the metal from the end of the attaching portion 13 over the surface of the panel 10 and preferably expands the cross-sectional area of the attaching portion so as to fill in any irregularities in the punch aperture portion 11 of the panel, thus securely attaching the wiring lug to the panel.

The body of the wiring lug may be of any suitable form and construction and advantageously comprises a head portion 17 spaced from said base portion 14ª and connected by a reduced leg portion 18. The edges of the leg portions are preferably serrated as at 19 to facilitate attaching the base core of a conductor C thereto, as by winding the wire around the leg portion prior to soldering the connection. Thus the leg portion 18 is interposed between enlarged head and base portions 17 and 14ª respectively, preventing the attached wire from being slipped off of the wiring lug.

In practice the attaching portion 13 of the wiring lug is inserted in the aperture portion 11 of the panel aperture and the protruding end thereof is upset over the marginal edges of the panel to securely clamp the attaching portion 13 of the lug between the upset portion and the shoulders 15 of the base 14ª. The conductor C to be connected to the lug may be passed through the angularly disposed opening 12 and the bare core end thereof wrapped around the leg portion 18 and secured thereto in non-slipping relation by engagement with the serrated edges 19 thereof.

Although I have illustrated and described a preferred form of my invention, I do not wish to be limited thereby because the scope of my invention is best defined by the following claims.

I claim:

1. A terminal panel comprising a supporting member of insulating material formed with a T-shaped opening, a wiring lug formed with an attaching portion of rectangular section and of greater length than the thickness of the supporting member and fitted into one angular sectional part of said opening, the terminal end portion of said attaching lug being upset over marginal edge portions of the opening of said supporting member, the other angular sectional portion of said opening affording passage for a conductor to be attached to an extension of said lug.

2. A terminal panel comprising a supporting member of insulating material formed with an irregularly shaped opening having an elongated narrow lug-receiving portion and a narrow angularly disposed conductor-receiving elongation extending therefrom, a wiring lug formed with an attaching portion of solid regular section conforming substantially in shape to the lug-receiving portion of said opening and a conductor-receiving extension a part of which is disposed in the plane of the attaching portion, said attaching portion being of greater length than the thickness of said supporting member and fitted into the lug-receiving portion of said opening, the terminal end portion of said attaching lug being upset over marginal edge portions of the opening of said supporting member for securely attaching the wiring lug thereto, and the angularly disposed elongation of said opening affording passage for a conductor to be attached to the conductor-receiving extension of said lug.

WILFORD C. MacFADDEN.

REFERENCES CITED

The following references are of record in the file of this patent:

UNITED STATES PATENTS

| Number | Name | Date |
|---|---|---|
| 2,283,136 | Dunn | May 12, 1942 |
| 1,011,439 | Kaisling | Dec. 12, 1911 |
| 1,847,100 | Rock | Mar. 1, 1932 |
| 1,856,681 | Wolcott | May 3, 1932 |